United States Patent [19]
Park

[11] Patent Number: 5,887,108
[45] Date of Patent: Mar. 23, 1999

[54] METHOD AND APPARATUS FOR OUTPUTTING VIDEO DATA OF A VIDEO COMPACT DISC PLAYER

[75] Inventor: Soon-Bae Park, Seoul, Rep. of Korea

[73] Assignee: Daewoo Electronics Co., Ltd., Seoul, Rep. of Korea

[21] Appl. No.: 69,770

[22] Filed: Apr. 30, 1998

[30] Foreign Application Priority Data

May 29, 1997 [KR] Rep. of Korea ............ 97-21560

[51] Int. Cl.$^6$ ............................................. H04N 9/79
[52] U.S. Cl. ............................................. 386/45; 386/125
[58] Field of Search ............................ 386/1, 45, 95, 386/125, 126, 46, 131; 348/563, 564, 569

[56] References Cited

U.S. PATENT DOCUMENTS

| | | | |
|---|---|---|---|
| 4,477,841 | 10/1984 | Chen et al. | 386/95 |
| 4,573,086 | 2/1986 | Sakai et al. | 386/131 |

FOREIGN PATENT DOCUMENTS 0 296 948 A1 12/1988 European Pat. Off. .
0 349 990 A2 1/1990 European Pat. Off. .
0 455 205 A1 11/1991 European Pat. Off. .

*Primary Examiner*—Wendy Garber
*Assistant Examiner*—Christopher Onuaku
*Attorney, Agent, or Firm*—Beveridge, DeGrandi, Weilacher & Young LLP

[57] ABSTRACT

The present invention is directed to a method and apparatus for outputting video data of a video compact disc player. A video signal of lines 1 to 425 recorded in a PAL system is outputted as a picture signal under the control of the control section, and the caption detecting section detects and counts a horizontal synchronizing signal included in a video signal corresponding to a region of 200 lines ranging between lines 426 and 625 recorded in the PAL system to detect an edge component. Further, the data mapping section compresses by half the video signal corresponding to the detected region of 200 lines and provides a compressed video signal as caption data. Therefore, when a video signal recorded thereon in the PAL system is displayed via a display equipment of an NTSC system, the picture signal is displayed on a screen which ranges between lines 1 and 425, and the caption signal is displayed on a screen which ranges between lines 426 and 525. Consequently, the video signal is displayed without a loss of caption data.

9 Claims, 4 Drawing Sheets

METHOD AND APPARATUS FOR OUTPUTTING VIDEO DATA OF A VIDEO COMPACT DISC PLAYER

BACKGROUND OF THE INVENTION

1. Field of the Invention

The present invention relates to a method and apparatus for outputting video data of a video compact disc player and more particularly, relates to the method and apparatus wherein caption data is displayed without a loss of outputted caption data while video data having caption data of a PAL system is reproduced via a display equipment of an NTSC system in a video compact disc player.

2. Description of the Prior Art

As audio/video recording media have made progress, optical disc players which record audio/video signals onto semipermanent optical discs and which reproduce recorded audio/video signals, have also developed.

More particularly, the optical disc players such as a compact disc player (referred to as "CDP"), a laser disc player (referred to as "LDP"), a compact disc graphic player (referred to as "CDGP"), a video compact disc player (referred to as "VCDP") and the like, have become increasingly used.

Also, because these optical disc players output video and/or audio signals recorded on the optical discs via speakers rather than via video and/or audio reproducing equipment and because they have a much higher signal-to-noise ratio than conventional video and/or audio reproducing equipment, they are capable of reproducing signals with even better quality(s) of picture and/or of sound, and do not produce a noise caused by unstable reproduction and modulation. Additionally, they have many advantages such as the reproduction of video and/or audio signals in a state which is almost not subjected to distortion and to ghost, a random access operation and the like, and thereby tend to rapidly make progress and to be widely used.

Meanwhile, as is generally known, video data is recorded together with audio data onto video compact discs (referred to as "VCD's") which are loaded into VCDP's among the optical discs which are loaded into the optical disc players to reproduce recorded signals therefrom, and provides sounds and pictures to users. Additionally, as is generally known, the video data which is recorded onto the VCD's would be recorded in a system of national television system committee (hereinafter, referred to as "NTSC") or of phase alternation by line (hereinafter, referred to as "PAL") or the like. Further, display equipment which is connected to VCDP's to provide sounds and pictures, would be display equipment of the system of the NTSC, PAL and the like.

Generally, video data of the PAL system which is displayed via display equipment of the PAL system has 625 scanning lines and video data of the NTSC system which is displayed via display equipment of the NTSC system has 525 scanning lines.

As a result, if a display equipment of the NTSC system display the video data which is recorded in the PAL system, it gives rise to a loss of a region corresponding to 100 lines which is placed at a lower end portion on a screen of the display equipment. In particular, as a conventional caption is placed at a lower portion of a screen, the above lost region corresponding to 100 lines is not even displayed or is displayed with most of the lost region thereof cut off.

SUMMARY OF THE INVENTION

Therefore, it is a first object of the present invention to provide a method by which caption data is displayed without a loss of outputted caption data while video data having caption data of a PAL system is reproduced via a display equipment of an NTSC system in a video compact disc player.

It is a second object of the present invention to provide an apparatus which is adapted for outputting video data of a video compact disc player by the above method.

In order to achieve the first object, the present invention provides a method for outputting video data of a video compact disc player, which comprises the steps of:

(i) converting a digital video signal into an analog video signal in response to a key input signal;

(ii) generating a subcarrier signal in response to a recording system of data;

(iii) encoding the analog video signal into a red-green-blue video signal in response to the subcarrier signal;

(iv) checking whether or not a switching control signal is inputted;

(v) whether it is judged in step (iv) that the switching control signal is not inputted, by-passing an encoded red-green-blue video signal to output a video signal, and returning to step (iv);

(vi) cutting off the encoded red-green-blue video signal when it is judged in step (iv) that the switching control signal is inputted;

(vii) detecting a horizontal synchronizing signal and detecting a caption signal;

(viii) checking whether or not a control signal is inputted;

(ix) returning to step (iv) when it is judged in step (viii) that the control signal is not inputted; and (x) when it is judged in step (viii) that the control signal is inputted, on-screen-display-processing digitized caption data, and outputting caption data.

In order to achieve the second object, the present invention provides an apparatus for outputting video data of a video compact disc player method, which comprises:

key inputting means for providing a key input signal;

optical pickup means for providing a radio frequency signal from a disc having caption data recorded therein in a phase alternation by line system in response to the key input signal from the key inputting means;

driving means for driving the optical pickup;

radio frequency amplifying means for amplifying the radio frequency signal from the optical pickup means;

digital signal processing means for digital-signal-processing the radio frequency signal amplified by the radio frequency amplifying means;

clock generating means for a relevant subcarrier signal in response to a recording system of data to be reproduced;

video decoding means for decompressing and decoding a compressed digital video signal from the digital signal processing means;

video digital-to-analog converting means for converting the digital video signal decoded by the video decoding means into an analog signal;

red-green-blue encoding means for encoding the analog video signal converted by video digital-to-analog converting means into a red-green-blue video signal;

caption detecting means for detecting a caption signal of the red-green-blue video signal encoded by the red-green-blue encoding means;

control means for recognizing the caption signal detected by the caption detecting means and for providing a relevant character data and control signal together with a switching control signal;

switching means for selectively providing the red-green-blue video signal encoded by the red-green-blue encoding means and for grounding the encoded red-green-blue video signal in response to the switching control signal from the control means; and on-screen-display processing means for by-passing the encoded red-green-blue video signal switched by the switching means to be displayed, and for on-screen-display-processing both the character data in accordance with the control signal from the control means.

In the method and apparatus for outputting video data of a video compact disc player according to the present invention, in the case where video data having caption data of the PAL system is reproduced via a display equipment of an NTSC system, while a horizontal synchronizing signal of video signal recorded in a PAL system is being counted, lines 1 to 425 thereof are outputted through a bypass and edge components of lines 426 to 625 thereof are detected. Afterwards, detected edge components are compressed into a signal of a region corresponding to 100 lines which is then mapped to a character. After that, a mapped signal is coded to be displayed. Consequently, the video signal recorded in the PAL system is outputted without a loss of caption data.

BRIEF DESCRIPTION OF THE DRAWINGS

The above objects and other advantages of the present invention will become more apparent by describing in detail a preferred embodiment thereof with reference to the attached drawings, in which.

DESCRIPTION OF THE PREFERRED EMBODIMENT

A description will be given below in detail with reference to accompanying drawings to a configuration and an operation of a method and apparatus for outputting video data of a video compact disc player, according to an embodiment of the present invention.

Figure 1:
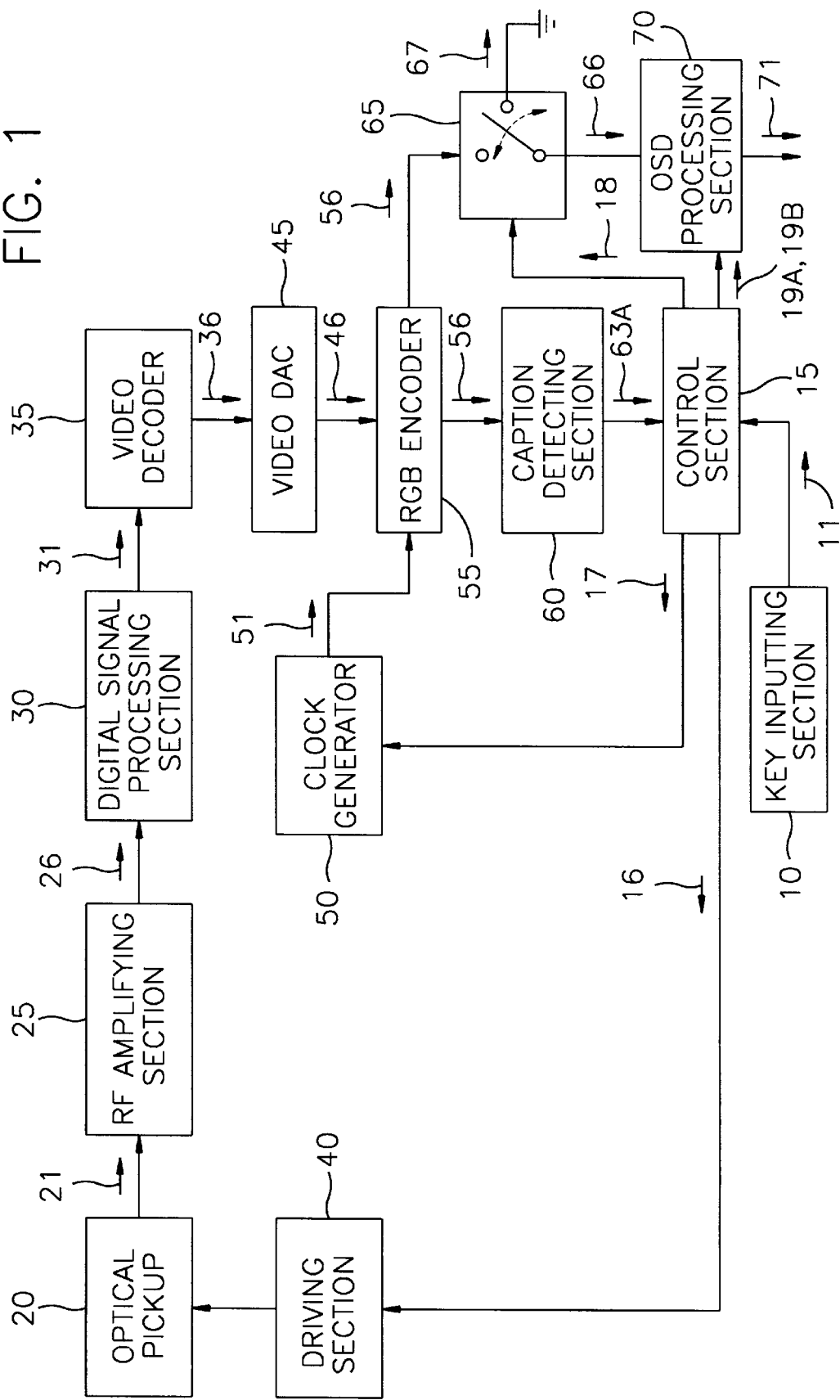
FIG. 1 is a block diagram for showing a circuit configuration of an apparatus for outputting video data of a video compact disc player according to an embodiment of the present invention.

FIG. 1 is a block diagram for showing a circuit configuration of an apparatus for outputting video data of a video compact disc player according to an embodiment of the present invention.

As shown in FIG. 1, an apparatus for outputting video data of a video compact disc player comprises a key inputting section 10, a control section 15, an optical pickup 20, a radio frequency (hereinafter, referred to as "RF") amplifying section 25, a digital signal processing section 30, a video decoder 35, a driving section 40, a video digital-to-analog converter (hereinafter, referred to as "DAC") 45, a clock generator 50, a red-green-blue (hereinafter, referred to as "RGB") encoder 55, a caption detecting section 60, a switching section 65 and an on-screen-display processing section 70.

Key inputting section 10 has a plurality of function keys (not shown) and provides a key signal 11 for executing functions which are set via the function keys by a user.

Control section 15 provides first to fourth control signals 16 to 18 and 19B for executing a relevant function in response to key signal 11 from key inputting section 10.

During a reproducing operation, optical pickup 20 irradiates a light beam onto a disc which is loaded onto a disc tray (not shown), and converts a light reflected from the disc into an electric signal, i.e., a reproduction signal. The reproduction signal corresponds to an RF signal 21 and optical pickup 20 provides RF signal 21 to RF amplifying section 25.

RF amplifying section 25 amplifies RF signal 21 from optical pickup 20 and provides an amplified RF signal 26. Digital signal processing section 26 executes an error detection and an error correction operation for amplified RF signal 26 from RF amplifying section 25 and digital-signal-processes amplified RF signal 26 to provide a digital-signal-processed signal 31.

In order to execute the function such as a reproduction and the like, according to first control signal 16 from control section 15, driving section 40 drives optical pickup 20 and rotates the disc which is loaded onto the disc tray.

Clock generator 50 generates a color subcarrier signal for processing a video signal. Namely, in accordance with a recording system, i.e., the NTSC or PAL system, in which the video signal to be reproduced is recorded on the disc, in response to second control signal 17 from control section 15, clock generator 50 provides a clock signal 51 having approximately 3.58 [MHz] corresponding to a subcarrier signal of the NTSC system or provides a clock signal 51 having approximately 4.43 [MHz] corresponding to a sub-carrier signal of the PAL system.

During a reproduction, in the case where a video signal of the PAL system having caption data therein is recorded on the disc which is loaded onto the disc tray, at first, control section 15 provides second control signal 17 to clock generator 50 in response to key signal 11 from key inputting section 10, and controls clock generator 50 to provide to RGB encoder 55 clock signal 51 of approximately 4.43 [MHz] corresponding to the subcarrier signal of the PAL system. Consequently, control section 15 sets a mode for processing the video signal to a PAL mode.

While executing the reproduction, control section 15 controls driving section 40 to drive optical pickup 20, and causes digital video signal 31 compressed after passing through RF amplifying section 25 and digital signal processing section 30 to be provided to video decoder 35.

Video decoder 35 decompresses to decode compressed digital video signal 31 from digital signal processing section 30 and provides a decoded digital video signal 36 to video DAC 45.

Video DAC 45 converts decoded digital video signal 36 from video decoder 35 into an analog signal and provides a converted analog video signal 46 to RGB encoder 55. RGB encoder 55 encodes analog video signal 46 from video DAC 45 and provides an encoded RGB video signal 56 to caption detecting section 60 and to switching section 65. Then, encoded RGB video signal 56 provided to switching section 65 is provided to a display equipment (not shown) via switching section 65 and via OSD processing section 70, and the display equipment displays a picture while receiving this video signal.

Caption detecting section 60 detects an edge component from a predetermined region of encoded RGB video signal 56 from RGB encoder 55 and converts a detected edge component into a predetermined code to detect a caption signal. A coded caption signal 63A is provided to control section 15.

Figure 2:
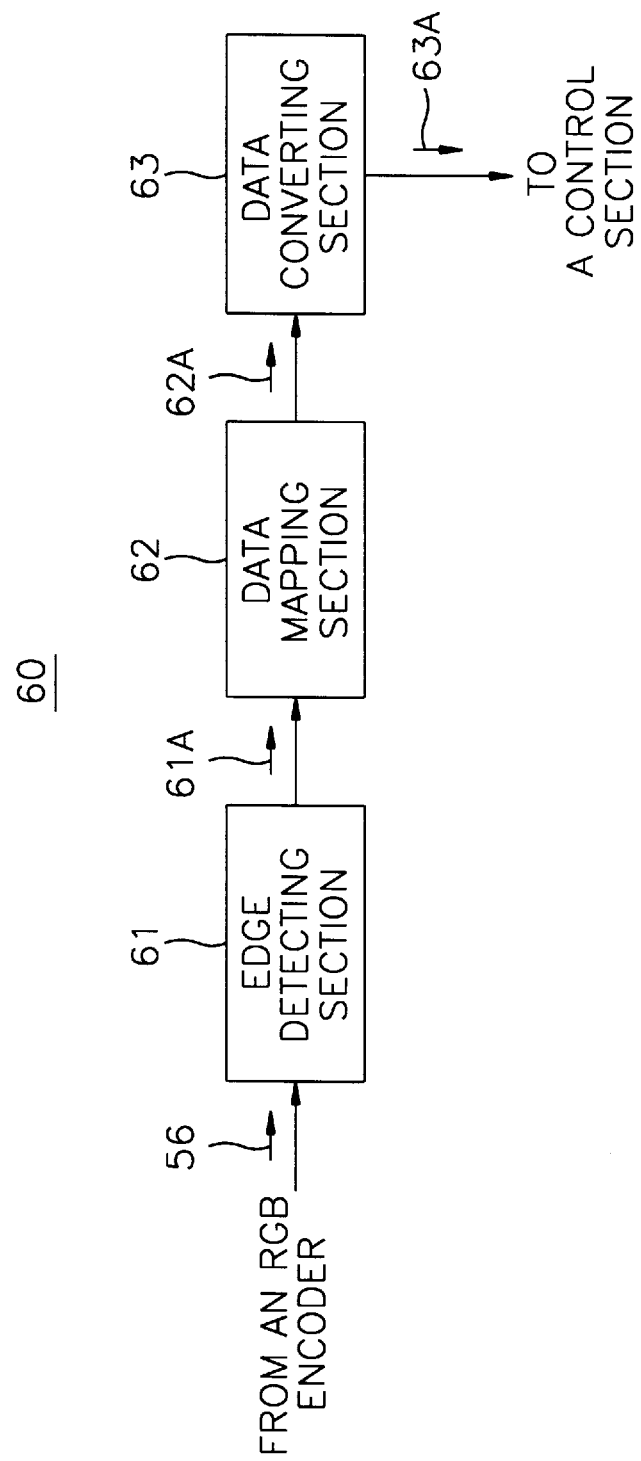
FIG. 2 is a block diagram for showing a circuit configuration of a caption detecting section shown in FIG. 1.

FIG. 2 is a block diagram for showing a circuit configuration of a caption detecting section shown in FIG. 1.

As shown in FIG. 2, caption detecting section 60 includes an edge detecting section 61, a data mapping section 62 and a data converting section 63.

Edge detecting section 61 detects an edge component of encoded RGB video signal 56 from RGB encoder 55 and provides a detected edge component 61A to data mapping section 62.

Data mapping section 62 maps detected edge component 61A from edge detecting section 61 to a character and provides a mapped signal 62A to data converting section 63.

Data converting section 63 converts mapped signal 62A from data mapping section 62 into a predetermined digital data and provides a coded caption data 63A to control section 15.

According to the present invention, because caption data is an edge component whose luminance level abruptly changes with reference to a background picture in general, the caption data can be obtained by detecting the edge component of a video signal.

While receiving coded caption data 53A from caption detecting section 60, control section 15 recognizes coded caption data 63A and provides relevant character data 19A and fourth control signal 19B to OSD processing section 70. Simultaneously, control section 15 provides a switching control signal 18, i.e., a third control signal, to switching section 65.

While selectively outputting encoded RGB video signal 56 from RGB encoder 55, switching section 65 grounds encoded RGB video signal 56 in accordance with switching control signal 18 from control signal 15.

When receiving character data 19A and fourth control signal 19B from control section 15 while providing to the display equipment encoded RGB video signal 66 switched by switching section 65 to be displayed, OSD processing section 70 OSD-process character data 19A and provides an OSD-processed character data 71 to the display equipment. Consequently, caption data is displayed at a predetermined region on a screen of the display equipment.

According to the present invention, edge detecting section 61 included in caption detecting section 60 detects a horizontal synchronizing signal included in a video signal of the PAL system and counts a detected horizontal synchronizing signal while detecting the edge component from encoded RGB video signal 56. At this time, edge detecting section 61 does not detect the edge components of the horizontal synchronizing signal from lines 1 to 425 thereof but detects the edge components thereof in a region between lines 426 and 625 thereof.

Also, data mapping section 62 compresses the edge components detected from 200 lines of the video signal into a signal of a region corresponding to 100 lines which is then mapped to a character. Mapped signal 62A is then provided to data converting section 63.

Data converting section 63 converts mapped character data 62A into a digital code and provides encoded caption data 63A to control section 15. As a result, all of the characters can be displayed in a region corresponding to 100 lines on a screen of the display equipment.

While processing character data 19A from control section 15, OSD processing 70 is not supplied with a video signal and OSD-processes to display a background picture of a predetermined color.

A description will next be made of the procedure of a method for outputting video data of a video compact disc player which is executed by the apparatus shown in FIG. 1, in accordance with the flowchart of FIGS. 3 and 4.

Figure 3:
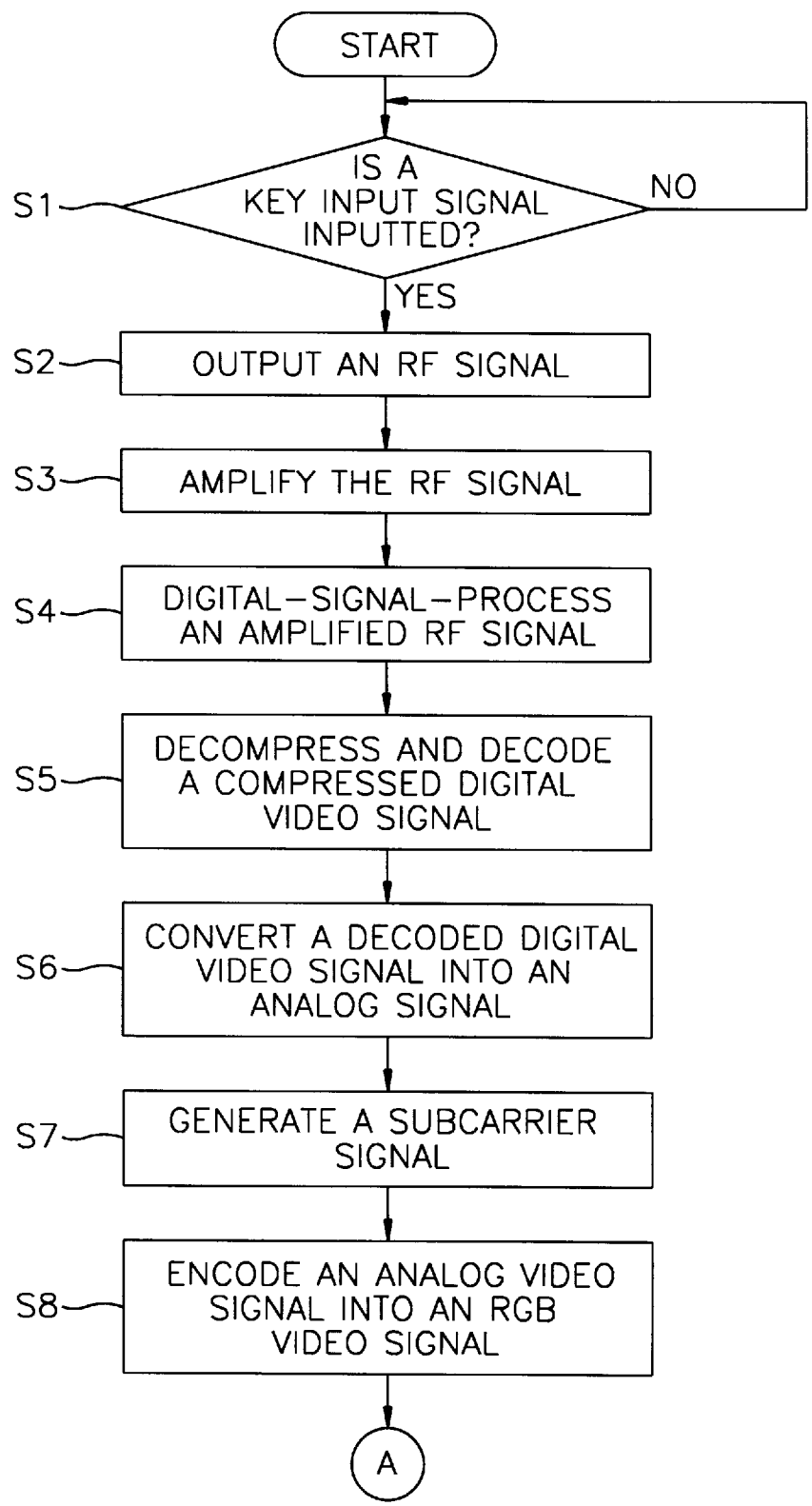
FIGS. 3 and 4 are a flowchart for illustrating a method for outputting video data of a video compact disc player by using the apparatus shown in FIG. 1.
Figure 4:
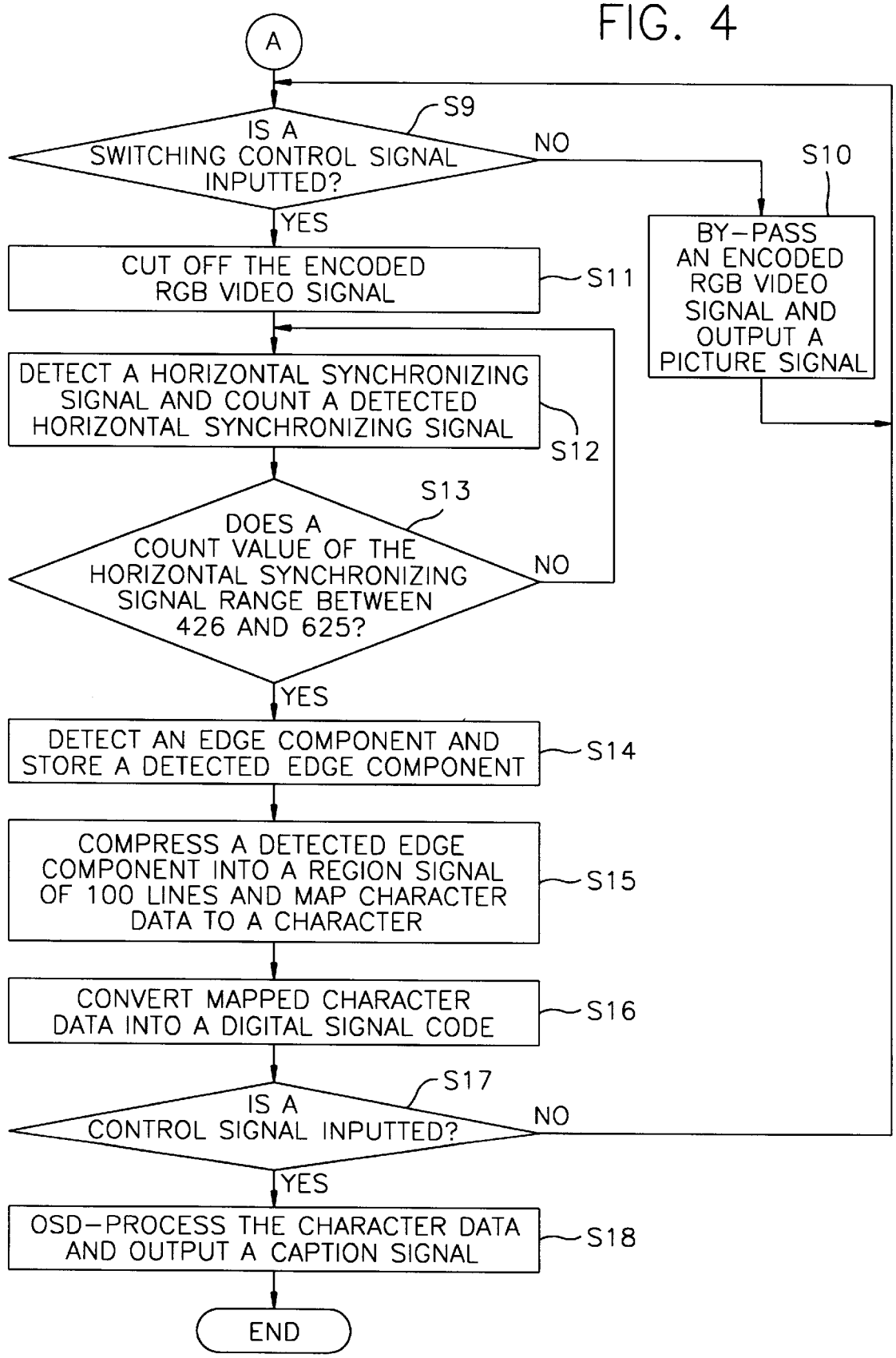

FIGS. 3 and 4 are a flowchart for illustrating a method for outputting video data of a video compact disc player by using the apparatus shown in FIG. 1.

As illustrated in FIGS. 3 and 4, whether or not key input signal 11 is supplied from key inputting section 10 to control section 15 is checked (step S1).

When it is checked in step S1 that key input signal 11 is provided to control section 15, RF signal 21 is supplied from optical pickup 20 to RF amplifying section 25 (step S2).

RF signal 21 provided to RF amplifying section 25 is amplified with a predetermined gain and amplified RF signal 26 is provided to digital signal processing section 30 (step S3).

Amplified RF signal 26 provided to digital signal processing section 30 is error-detected, error-corrected and digital-signal-processed and compressed digital video signal 31 is provided to video decoder 35 (step S4).

Compressed digital video signal 31 provided to video decoder 35 is decompressed and is then decoded. Then, decoded digital video signal 36 is provided to video DAC 45 (step S5).

Decoded digital video signal 36 provided to video DAC 45 is converted into an analog signal and converted analog video signal 46 is provided to RGB encoder 55 (step S6).

Clock signal 51 of approximately 4.43 [MHz] corresponding to the subcarrier 20 signal is generated from clock generator 50 in response to clock control signal 17 from control section 15 (step S7).

Analog signal video signal 46 provided to RGB encoder 55 is encoded into the RGB video signal in response to the subcarrier (step S8).

Afterwards, control section 15 checks whether or not switching control signal 18 is provided to switching section 65 (step S9).

When it is judged in step S9 that switching control signal 18 is not provided from control section 15 to switching section 65, encoded RGB video signal 56 is provided as a picture signal while passing through OSD processing section 70 (step S10).

Also, when it is judged in step S9 that switching control signal 18 is provided to switching section 65, switching section 65 grounds encoded RGB video signal 56 and cuts it off (step S11).

Edge detecting section 61 detects the horizontal synchronizing signal which is included in encoded RGB video signal 56 and counts the detected horizontal synchronizing signal (step S12).

Edge detecting section 61 checks whether the count value of the horizontal synchronizing signal counted in step S12 is an integer which ranges between 426 and 625 (step S13).

When it is judged in step S13 that the count value is an integer which ranges between 1 and 425, edge detecting section 61 does not detect the edge component of the horizontal synchronizing signal but detects the edge components thereof in a range between lines 426 and 625 thereof (step S14).

Afterwards, data mapping section 62 compresses the edge components detected from 200 lines detected in step S14 into a signal of a region corresponding to 100 lines and maps character data to a character (step S15).

Data converting section 63 converts the character data mapped in step S15 into a digital signal code (step S16).

After that, whether fourth control signal 19B is supplied from control section 15 to OSD processing section 70 is checked (step S17).

When it is judged in step S17 that fourth control signal 19B is provided to OSD processing section 70, the procedure returns to step S9. When it is judged in step S17 that fourth control signal 19B is not provided to OSD processing section 70, OSD processing section 70 OSD-processes a digitized character data and provides a caption signal 71 (step S18).

In the method and apparatus for outputting video data of a video compact disc player according to the present invention, a video signal of lines 1 to 425 recorded in a PAL system is outputted as a picture signal under the control of the control section, and the caption detecting section detects and counts a horizontal synchronizing signal included in a video signal corresponding to a region of 200 lines ranging between lines 426 and 625 recorded in the PAL system to detect an edge component.

Further, the data mapping section compresses by half the video signal corresponding to the detected region of 200 lines and provides a compressed video signal as caption data. Therefore, when a video signal recorded thereon in the PAL system is displayed via a display equipment of an NTSC system, the picture signal is displayed on a screen which ranges between lines 1 and 425 and the caption signal is displayed on a screen which ranges between lines 426 and 525. Consequently, the video signal is displayed without a loss of caption data.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A method for outputting video data of a video compact disc player, said method comprising the steps of:
   (i) converting a digital video signal into an analog video signal in response to a key input signal;
   (ii) generating a subcarrier signal in response to a recording system of data;
   (iii) encoding the analog video signal into a red-green-blue video signal in response to the subcarrier signal;
   (iv) checking whether or not a switching control signal is inputted;
   (v) whether it is judged in step (iv) that the switching control signal is not inputted, by-passing an encoded red-green-blue video signal to output a video signal, and returning to step (iv);
   (vi) cutting off the encoded red-green-blue video signal when it is judged in step (iv) that the switching control signal is inputted;
   (vii) detecting a horizontal synchronizing signal and detecting a caption signal;
   (viii) checking whether or not a control signal is inputted;
   (ix) returning to step (iv) when it is judged in step (viii) that the control signal is not inputted; and
   (x) when it is judged in step (viii) that the control signal is inputted, on-screen-display-processing digitized caption data, and outputting caption data.

2. The method for outputting video data of a video compact disc player as claimed in claim 1, wherein said step (i) comprises:
   (i-1) checking whether or not the key input signal is inputted;
   (i-2) outputting a radio frequency signal from a disc having caption data recorded thereon in a phase alternation by line system in response to the key input signal inputted in step (i-1);
   (i-3) amplifying the radio frequency signal outputted in step (i-2);
   (i-4) digital-signal-processing the radio frequency signal amplified in step (i-3);
   (i-5) decompressing and decoding a compressed digital video signal digital-signal-processed in step (i-4); and
   (i-6) converting a decoded digital video signal decoded in step (i-5) into an analog signal.

3. The method for outputting video data of a video compact disc player as claimed in claim 1, wherein said subcarrier signal is a clock signal of 4.43 related to data recorded in the phase alternation by line system.

4. The method for outputting video data of a video compact disc player as claimed in claim 1, wherein said step (vii) comprises:
   (vii-1) detecting the horizontal synchronizing signal from the red-green-blue signal encoded in step (iii), and counting a detected horizontal synchronizing signal;
   (vii-2) checking whether or not a count value of the horizontal synchronizing signal counted in step (vii-1) is placed in a predetermined range;
   (vii-3) returning to step (vii-1) when it is judged in step (vii-2) that the count value is not placed in the predetermined range;
   (vii-4) detecting an edge component when it is judged in step (vii-2) that the count value is placed in the predetermined range;
   (vii-5) compressing the edge component detected in step (vii-4) into a signal of a region corresponding to predetermined lines, and mapping character data to a character; and
   (vii-6) converting the character data mapped in step (vii-5) into a digital code.

5. The method for outputting video data of a video compact disc player as claimed in claim 4, wherein said predetermined range is a set of integers ranging between 426 and 625.

6. An apparatus for outputting video data of a compact disc player, said apparatus comprising:
   key inputting means for providing a key input signal;
   optical pickup means for providing a radio frequency signal from a disc having caption data recorded therein in a phase alternation by line system in response to the key input signal from said key inputting means;
   driving means for driving said optical pickup;
   radio frequency amplifying means for amplifying the radio frequency signal from said optical pickup means;
   digital signal processing means for digital-signal-processing the radio frequency signal amplified by said radio frequency amplifying means;
   clock generating means for a relevant subcarrier signal in response to a recording system of data to be reproduced;
   video decoding means for decompressing and decoding a compressed digital video signal from said digital signal processing means;
   video digital-to-analog converting means for converting the digital video signal decoded by said video decoding means into an analog signal;
   red-green-blue encoding means for encoding the analog video signal converted by video digital-to-analog converting means into a red-green-blue video signal;

caption detecting means for detecting a caption signal of the red-green-blue video signal encoded by said red-green-blue encoding means;

control means for recognizing the caption signal detected by said caption detecting means and for providing a relevant character data and control signal together with a switching control signal;

switching means for selectively providing the red-green-blue video signal encoded by said red-green-blue encoding means and for grounding the encoded red-green-blue video signal in response to the switching control signal from said control means; and on-screen-display processing means for by-passing the encoded red-green-blue video signal switched by said switching means to be displayed, and for on-screen-display-processing both the character data in accordance with the control signal from said control means.

7. The apparatus for outputting video data of a compact disc player as claimed in claim 6, wherein said caption detecting means comprises:

edge detecting means for detecting an edge component from the encoded red-green-blue video signal;

data mapping means for mapping the edge component detected by said edge detecting means to a character; and data converting means for converting a signal mapped to the character by said data mapping means into a digital code.

8. The apparatus for outputting video data of a compact disc player as claimed in claim 7, wherein said edge detecting means does not detect the edge component of a horizontal synchronizing signal from lines 1 to 425 thereof but detects the edge component thereof in a region ranging between lines 426 and 625 thereof while detecting the horizontal synchronizing signal from the encoded red-green-blue video signal and counting a detected horizontal synchronizing signal.

9. The apparatus for outputting video data of a compact disc player as claimed in claim 7, wherein said data mapping means compresses the edge components of 200 lines of the video signal detected by said edge detecting means into a signal of a region corresponding to 100 lines, and maps character data to a character.

* * * * *